(12) United States Patent
Kim et al.

(10) Patent No.: US 11,816,245 B2
(45) Date of Patent: Nov. 14, 2023

(54) METHOD FOR ANALYSIS ON INTERIM RESULT DATA OF DE-IDENTIFICATION PROCEDURE, APPARATUS FOR THE SAME, COMPUTER PROGRAM FOR THE SAME, AND RECORDING MEDIUM STORING COMPUTER PROGRAM THEREOF

(71) Applicant: FASOO CO., LTD., Seoul (KR)

(72) Inventors: Gi Tae Kim, Seoul (KR); Sung Wook Jo, Bucheon (KR); Myeong Sik Hwang, Seoul (KR)

(73) Assignee: FASOO CO., LTD., Seoul (KR)

( * ) Notice: Subject to any disclaimer, the term of this patent is extended or adjusted under 35 U.S.C. 154(b) by 313 days.

(21) Appl. No.: 16/845,454

(22) Filed: Apr. 10, 2020

(65) Prior Publication Data
US 2020/0327253 A1 Oct. 15, 2020

(30) Foreign Application Priority Data

Apr. 15, 2019 (KR) .......................... 10-2019-0043712

(51) Int. Cl.
*G06F 9/38* (2018.01)
*G06F 21/62* (2013.01)

(52) U.S. Cl.
CPC ........ *G06F 21/6254* (2013.01); *G06F 9/3836* (2013.01)

(58) Field of Classification Search
CPC ..... G06F 9/3836; G06F 16/20; G06F 21/6254
See application file for complete search history.

(56) References Cited

U.S. PATENT DOCUMENTS

| | | | | |
|---|---|---|---|---|
| 2004/0199781 | A1* | 10/2004 | Erickson | ................. G16Z 99/00 726/26 |
| 2016/0171243 | A1* | 6/2016 | Maeda | ................ G06F 21/6254 726/27 |
| 2017/0124351 | A1* | 5/2017 | Scaiano | .............. H04L 63/0421 |
| 2018/0012039 | A1* | 1/2018 | Takahashi | .............. G16H 10/60 |
| 2019/0188292 | A1* | 6/2019 | Gkoulalas-Divanis | ...................... G06N 5/025 |

(Continued)

FOREIGN PATENT DOCUMENTS

| | | |
|---|---|---|
| JP | 2012159982 A | 8/2012 |
| JP | 2015130022 A | 7/2015 |

(Continued)

OTHER PUBLICATIONS

Notice of Allowance, KR Application No. 10-2019-0043712, dated Feb. 3, 2021, 2 pgs.

*Primary Examiner* — Khoi V Le
(74) *Attorney, Agent, or Firm* — Morgan, Lewis & Bockius LLP

(57) ABSTRACT

The present disclosure relates to a method for analysis on interim result data in a de-identification procedure, an apparatus for the same, a computer program for the same, and a recording medium storing computer program thereof. A method for de-identification according to an example of the present disclosure may include: generating a first interim result data by applying a first de-identification process to an initial data; generating a first analysis metric for the first interim result data; and generating a final result data based on the first interim result data, when the first analysis metric satisfies a first de-identification criterion.

9 Claims, 10 Drawing Sheets

(56) References Cited

U.S. PATENT DOCUMENTS

2019/0266353 A1* 8/2019 Gkoulalas-Divanis ...................... G06F 21/602
2021/0366106 A1* 11/2021 Yao ...................... G06N 3/0454

FOREIGN PATENT DOCUMENTS

| JP | 2016133872 A | 7/2016 |
|----|--------------|--------|
| KR | 101859636 B1 | 5/2018 |

* cited by examiner

METHOD FOR ANALYSIS ON INTERIM RESULT DATA OF DE-IDENTIFICATION PROCEDURE, APPARATUS FOR THE SAME, COMPUTER PROGRAM FOR THE SAME, AND RECORDING MEDIUM STORING COMPUTER PROGRAM THEREOF

CROSS-REFERENCE TO RELATED APPLICATIONS

The present application claims priority to Korean Patent Application No. 10-2019-0043712 filed on Apr. 15, 2019, which is incorporated by reference herein in its entirety.

TECHNICAL FIELD

The present disclosure relates to a method for analysis on de-identification interim result data, an apparatus for the same, a computer program for the same, and a recording medium storing computer program thereof, and more particularly to a method configured to provide an analysis on interim result data occurring during an de-identification procedure, an apparatus for the same, a computer program for the same, and a recording medium storing computer program thereof.

BACKGROUND

As recent rapid development of information communication technology, personal information is collected and used through various routes, and a demand for protection of personal information is increasing. For example, in terms of the utilization of big data, the user agreement or de-identification processing is required for information including personal information.

Analysis of whether the de-identification process has been properly performed may include determination of usability (i.e., aspect of personal information utilization) and risk (i.e., aspect of personal information protection). Existing de-identification data analysis was performed on the final result data after completing a series of de-identification processing on the original data, and when the final result data is not appropriate, de-identification processing from the beginning had to be performed for the original data again. Since it is difficult to obtain a desired level of result data through a single de-identification process for a large amount of original data, the appropriateness of results of de-identification process may vary depending on the knowledge and experience of the user performing the de-identification process. As such, in the conventional de-identification method, a lot of trial and error is required for de-identification, and there is a problem that a large amount of time and resources are required.

Therefore, there is a need for a novel method for minimizing the time and resources required for the de-identification process, by supporting optimization for the de-identification process.

SUMMARY

It is a technical object of the present disclosure to provide a method and an apparatus for enabling analysis of interim result data occurring during de-identification procedure.

It is an additional technical object of the present disclosure to provide a method and an apparatus for supporting optimization of each step through analysis of de-identification interim result data.

It is an additional technical object of the present disclosure to provide a method and an apparatus for minimizing time and resources required to generate de-identification final result data.

The technical objects to be achieved by the present disclosure are not limited to the technical matters mentioned above, and other technical objects not mentioned are to be clearly understood by those skilled in the art from the following description.

A method for de-identification for a data according to an aspect of the present disclosure may comprise: generating a first interim result data by applying a first de-identification process to an initial data; generating a first analysis metric for the first interim result data; and generating a final result data based on the first interim result data, when the first analysis metric satisfies a first de-identification criterion.

An apparatus for de-identification for a data according to an additional aspect of the present disclosure may comprise: a transceiver; a memory; a user interface; and a processor. The processor may comprise: an interim result data generation unit configured to generate a first interim result data by applying a first de-identification process to an initial data; an analysis metric generation unit configured to generate a first analysis metric for the first interim result data; and a de-identification criteria determination unit configured to determine whether the first analysis metric satisfies a first de-identification criterion. The processor may be configured to generate, using the interim result data generation unit, a final result data based on the first interim result data, when the first analysis metric is determined to satisfy a first de-identification criterion by the de-identification criteria determination unit.

It is to be understood that the foregoing summarized features are exemplary aspects of the following detailed description of the present disclosure and are not intended to limit the scope of the present disclosure.

According to the present disclosure, by enabling an analysis of interim result data occurring during a de-identification procedure, a direction of the de-identification procedure may be easily determined without depending on a capability of a user performing de-identification.

According to the present disclosure, optimization for each de-identification process may be supported through an analysis of de-identification interim result data.

According to the present disclosure, by alleviating a burden of trial and error with re-doing an entire de-identification procedure, time required to generate a final data and resources required to maintain and store the final data may be minimized.

The advantageous effects of the present disclosure are not limited to the foregoing descriptions, and additional effects will become apparent to those having ordinary skill in the pertinent art to the present disclosure based upon the following descriptions.

DETAILED DESCRIPTION

Figure 1:
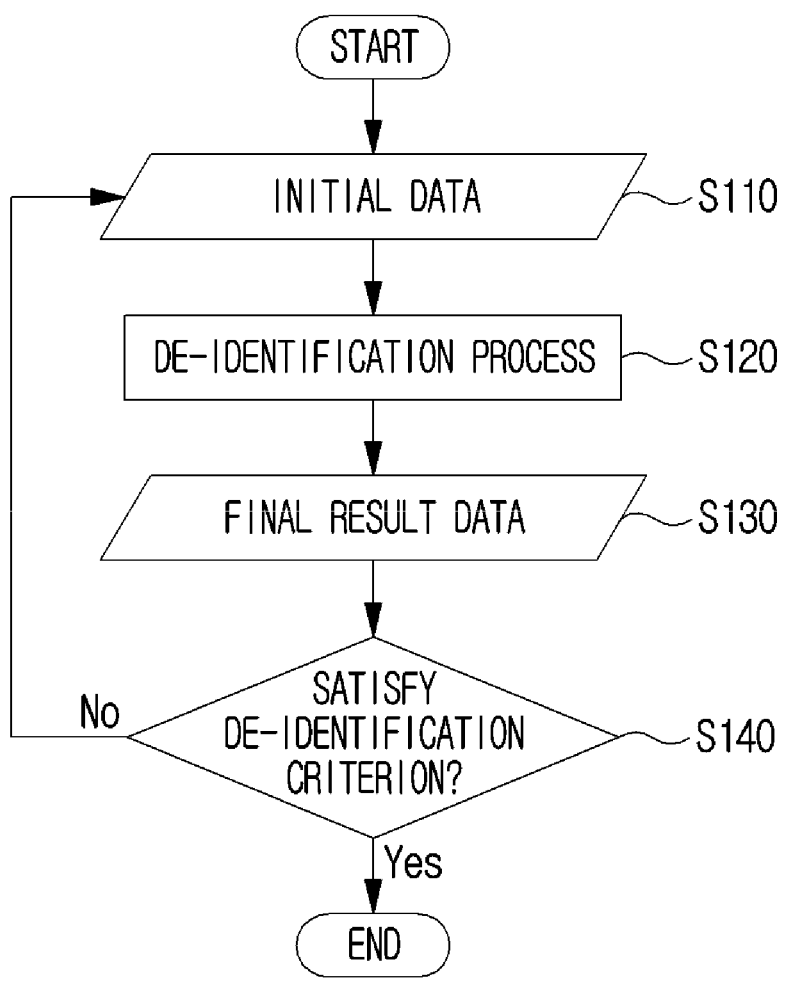
FIG. 1 is a flow diagram illustrating a de-identification method related to the present disclosure.

Hereinafter, embodiments of the present invention will be described in detail so that those skilled in the art can easily carry out the present invention referring to the accompanying drawings. However, the present disclosure may be embodied in many different forms and is not limited to the embodiments described herein.

In the following description of the embodiments of the present invention, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "accessed" to another element, it is understood to include not only a direct connection relationship but also an indirect connection relationship. Also, when an element is referred to as "containing" or "having" another element, it means not only excluding another element but also further including another element.

In the present disclosure, the terms "first", "second", and so on are used only for the purpose of distinguishing one element from another, and do not limit the order or importance of the elements unless specifically mentioned. Thus, within the scope of this disclosure, the first component in one embodiment may be referred to as a second component in another embodiment, and similarly a second component in one embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in one embodiment are also included within the scope of this disclosure. Also, embodiments that include other components in addition to the components described in the various embodiments are also included in the scope of the present disclosure.

The definitions of the terms used in the present disclosure are as follows.

De-identification process means an action that, by processing a part or all of personal information, prevents a specific individual from being identified easily even when combined with other information. De-identification process according to the present disclosure includes various schemes, for example, deleting or replacing a part or all of personal information through data value deletion, pseudonymization, totalization, categorization, data masking, or the like, applying a privacy protection model, or the like. However, the scope of the present disclosure is not limited by the schemes of de-identification process.

De-identification procedure refers to one or more de-identification processes performed sequentially or in parallel, and a de-identification final result data is generated by a de-identification procedure.

Initial data refers to target data in which the de-identification procedure according to the present disclosure is initiated. In the present disclosure, regardless of whether any de-identification process has been applied to an initial data, target data input or secured for a de-identification procedure according to the present disclosure is referred to as initial data. That is, an initial data may be original data in which no de-identification process has been performed at all, or may be data in which the original data has been transformed by applying any de-identification processing.

Interim result data means result data of each of one or more de-identification processes included in a de-identification procedure.

Analysis metric means a standardized measurement data indicating usability, risk, or the like of interim result data or final result data. Analysis metrics may be expressed in the form of values, graphs, indices, charts, or the like. However, the scope of the present disclosure is not limited to the content expressed by the analysis metric or the specific format.

De-identification criteria mean a predetermined value or requirement that the analysis metric for interim result data or the final result data is to be satisfied.

Hereinafter, a method, apparatus, system, computer program, and recording medium thereof for analyzing interim result data of a de-identification procedure according to the present disclosure will be described.

FIG. 1 is a flow diagram illustrating a de-identification method related to the present disclosure.

In step S110, initial data for de-identification may be input.

In step S120, a de-identification process for the initial data may be performed. That is, various de-identification processes may be sequentially performed for the initial data, and the present step indicates that a de-identification procedure is completed by performing all the de-identification processes.

In step S130, a final result data may be output as the de-identification procedure is completed.

In step S140, it may be determined whether the final result data satisfies the de-identification criteria. When the de-identification criteria are satisfied, the method of FIG. 1 terminates. When the de-identification criteria are not satisfied, the initial data of step S110 may be input again and the de-identification procedure may be performed again from the beginning.

According to the de-identification method described in FIG. 1, it cannot be confirmed whether the de-identification procedure is properly performed before the final result data is generated. In addition, the final result data derived through one de-identification procedure corresponds to one candidate, and the entire de-identification procedure must be repeated multiple times to obtain multiple candidates. Therefore, it takes a lot of time to obtain an optimized de-identification result, and requires a lot of resources (i.e., storage space) for storing a large number of final result data candidates.

Figure 2:
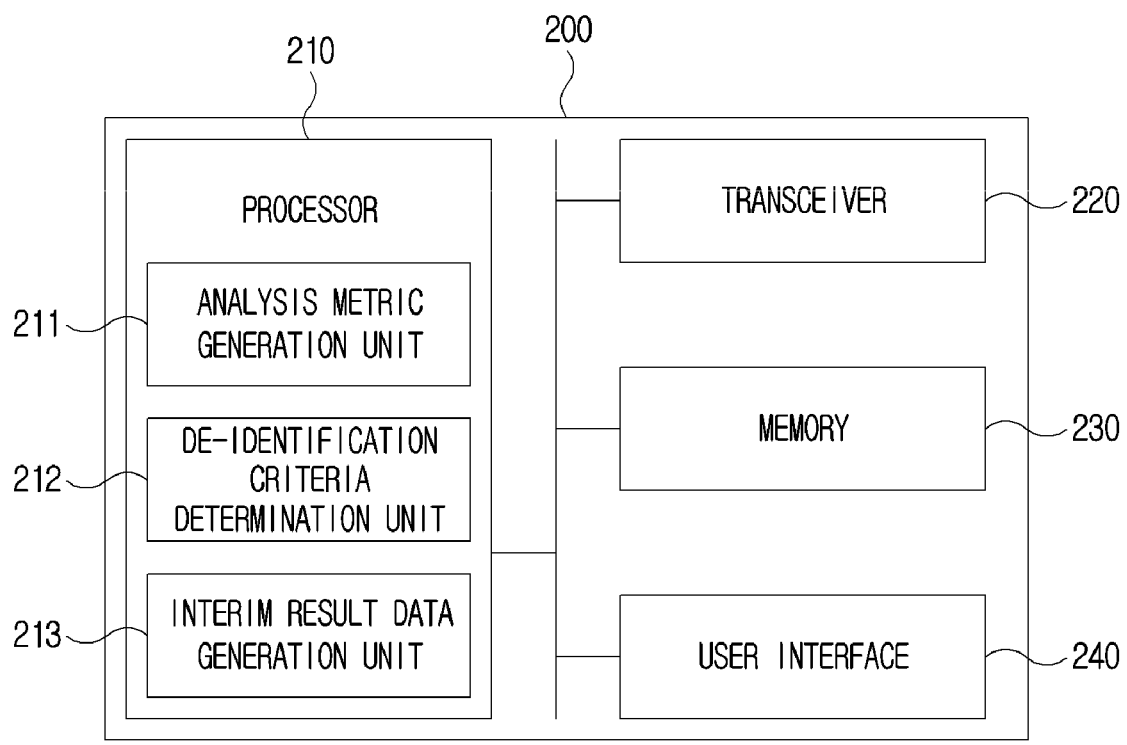
FIG. 2 is a block diagram conceptually showing a configuration of a de-identification device according to the present disclosure.

FIG. 2 is a block diagram conceptually showing a configuration of a de-identification device according to the present disclosure.

A de-identification device 200 may include a processor 210, a transceiver 220, a memory 230, and a user interface 240. The processor 210, the transceiver 220, the memory 230, and the user interface 240 may exchange data, requests, responses, commands, or the like through an internal communication network.

The processor 210 may control operations of the transceiver 220, the memory 230, and the user interface 240. The processor 210 may perform operations of de-identification process, analysis metric generation, or the like according to the present disclosure. In addition, the processor 210 may control the overall operation of the de-identification device 200 including components of the de-identification device 200 not shown in FIG. 2.

The transceiver 220 may perform a function of a physical layer that exchanges data with other entities through wired or wireless communication.

The memory 230 may store information generated or processed by the processor 210, software, operating system, application related to the operation of the de-identification device 200, or the like, and may include components such as a buffer. In addition, the memory 230 may store initial data, interim result data, original result data, analysis metrics, and de-identification criteria, or the like according to the present disclosure. In addition, the memory 230 may include a storage (e.g., a hard disk, etc.) for temporarily storing or maintaining data.

The user interface 240 may detect operations, inputs, or the like of a user for the de-identification device 200 and transport it to the processor 210, or may output the processing result of the processor 210 in a way that the user may recognize.

The processor 210 may include an analysis metric generation unit 211, a de-identification criteria determination unit 212, and an interim result data generation unit 213.

The analysis metric generation unit 211 may generate analysis metrics for data related to de-identification process, such as initial data, interim result data, and final result data.

The de-identification criteria determination unit 212 may generate a result of whether an analysis metric satisfies a de-identification criterion, by comparing the analysis metric generated by the analysis metric generation unit 211 with a de-identification criterion input by a user or predetermined.

The interim result data generation unit 213 may generate a result of a de-identification process as an interim result data. When a plurality of de-identification processes are performed, an interim result data may be generated for each of the plurality of de-identification processes.

In addition, a plurality of de-identification processes may be performed sequentially or in parallel. The scope of the present disclosure is not limited by the order of de-identification processing, and may include various methods for generating and managing a plurality of interim result data that are the result of a plurality of de-identification processes. According to the present disclosure, updated interim result data may be generated by combining a plurality of interim result data that are the result of a plurality of de-identification processes.

In combining a plurality of interim result data, for example, a part or all of the plurality of interim result data may be accumulated. That is, when combining a plurality of interim result data, all the interim result data may be maintained, or some interim result data may be replaced with another interim result data. As such, updated interim result data may be generated.

For example, in addition to a first interim result data that is a result of a first de-identification process (i.e., maintaining all the first interim result data), a result of a second de-identification process may be added to or accumulated on. Alternatively, a part or all of the first interim result data may be replaced with a result of the second de-identification process. For example, the result of the second de-identification process may be overwritten on a part or all of the first interim result data. As such, the second interim result data may be generated as updated interim result data.

The interim result data in a state in which the de-identification procedure is completed may be a final result data in itself. That is, in case when one de-identification procedure includes a plurality of de-identification processes, and interim result data in a state in which all de-identification processes corresponding to one de-identification procedure are performed and completed (i.e., combined or update-completed) may be used as the final result data without further processing. Alternatively, a part of the interim result data in a state in which the de-identification procedure is completed (i.e., combined or update-completed) may be extracted and used as the final result data.

Figure 3:
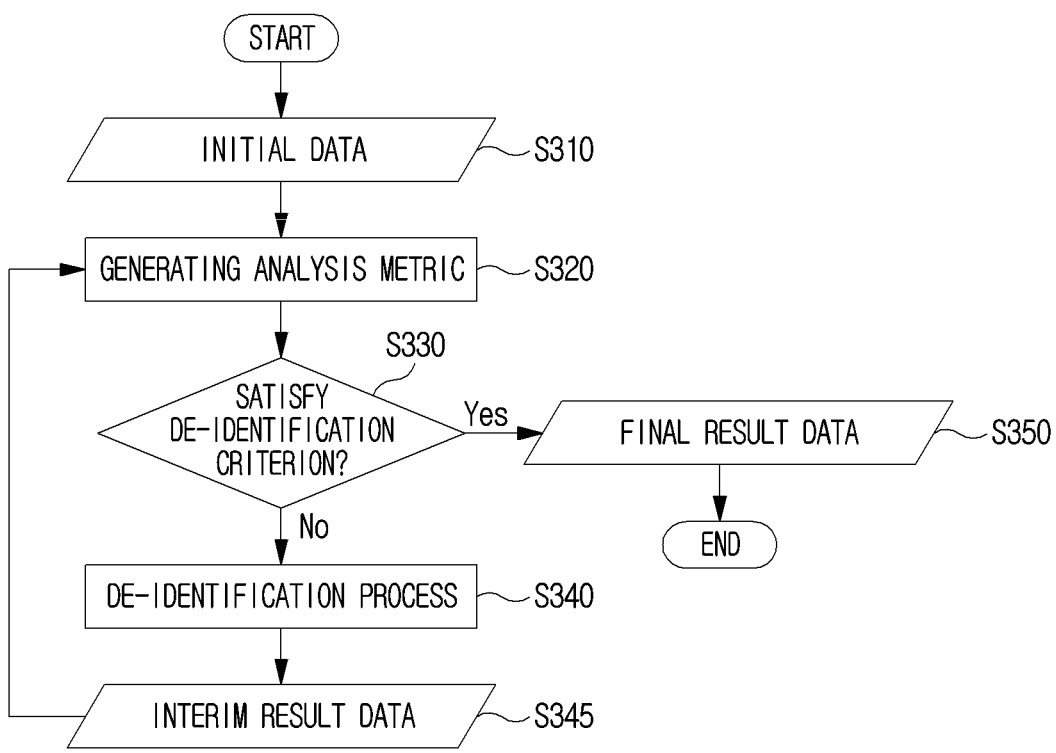
FIG. 3 is a flow diagram illustrating a de-identification method according to an example of the present disclosure.

FIG. 3 is a flow diagram illustrating a de-identification method according to an example of the present disclosure.

In step S310, a de-identification device or software may determine data, that is, initial data, subjected to de-identification process or analysis. Determining the initial data may include selecting initial data subjected to de-identification process or analysis among previously stored data, or may include receiving inputs of specific initial data. Determining the initial data may be performed by a user, or may be performed automatically by a de-identification device or software.

In step S320, an analysis metric for the initial data may be generated.

For example, the analysis metric may include information indicating risk, usability, or the like of the data. Analysis metrics for risk may include values, graphs, indices, charts, or the like on whether the data is sufficient to protect personal information. Analysis metrics for usability may include values, graphs, indices, charts, or the like on whether sufficient information remains to utilize the data.

In step S330, a determination as to whether the analysis metric for the initial data satisfies de-identification criteria may be performed.

For example, it may be determined whether a value or index of an analysis metric is greater than or equal to (or greater than) or less than (or less than or equal to) a value or index corresponding to a de-identification criterion. Alternatively, it may be determined whether a value or index of an analysis metric falls within a range of values or indices corresponding to a de-identification criterion.

For example, it may be determined whether a graph or chart of an analysis metric is the same as (or similar to) a graph or chart corresponding to a de-identification criterion. Alternatively, it may be determined whether a value or index representing a graph or chart of an analysis metric is greater than or equal to (or greater than) or less than (or less than or equal to) a value representing a graph or chart corresponding to a de-identification criterion. Alternatively, it may be determined whether a value or index representing a graph or chart of an analysis metric falls within a range of values or indices corresponding to a de-identification criterion.

When de-identification criteria are satisfied, a final result data may be generated based on the initial data in step S350. For example, the initial data itself may be used as the final result data, or a part of the initial data may be extracted and generated as the final result data.

When the de-identification criteria are not satisfied, a de-identification process for the initial data may be performed in step S340.

In most cases, an initial data may be in a state in which de-identification process has not been applied, or a degree of de-identification may not be sufficient. In this case, the steps of generating an analysis metric for the initial data and determining whether the de-identification criteria are satisfied may be omitted. That is, for the initial data, a de-identification process may be performed directly.

In step S340, a de-identification process may be performed on the initial data.

A de-identification process may include various ways of processing a part or all of personal information. For example, a de-identification process may include data value deletion, pseudonymization, totalization, categorization, data masking, or the like. In addition, a de-identification process may include applying a privacy protection model. In addition, a de-identification process may include a process performed before applying the privacy protection model and a process performed after applying the privacy protection model.

In step S345, an interim result data may be generated as a result of a de-identification process. This is referred to as a first interim result data to distinguish it from other interim result data.

Analysis metric generation and determination of whether de-identification criteria are satisfied may be performed on the first interim result data.

When de-identification criteria are satisfied, a final result data may be generated based on the first interim data. For example, the first interim data itself may be used as the final result data, or a part of the first interim data may be extracted and generated as the final result data.

When the de-identification criteria are not satisfied, an additional de-identification process for the first interim data may be performed. The result of the additional de-identification process may be generated as a second interim result data. The second interim result data may be generated as an updated interim result data based on the first interim result data.

Similarly, through the steps of generating an analysis metric for the interim result data and determining whether or not the de-identification criterion is satisfied, a procedure of additional de-identification process and generating updated interim result data may be repeated. Such repetition may be performed until an optimal result data are derived. That is, when the updated interim result data corresponds to an optimal result data, a final result data may be generated based on this, and the de-identification procedure may be terminated.

As described above, as well as for the initial data and the final result data, for the interim result data that is the result of each de-identification process, generating analysis metric and determining whether the de-identification criteria are satisfied may be performed.

Accordingly, de-identification processes may be optimized, a direction of subsequent de-identification processes may be easily set, and trial and error for re-doing the entire de-identification procedure may be reduced, thus time and resources required for the de-identification procedure may be minimized.

Figure 4:
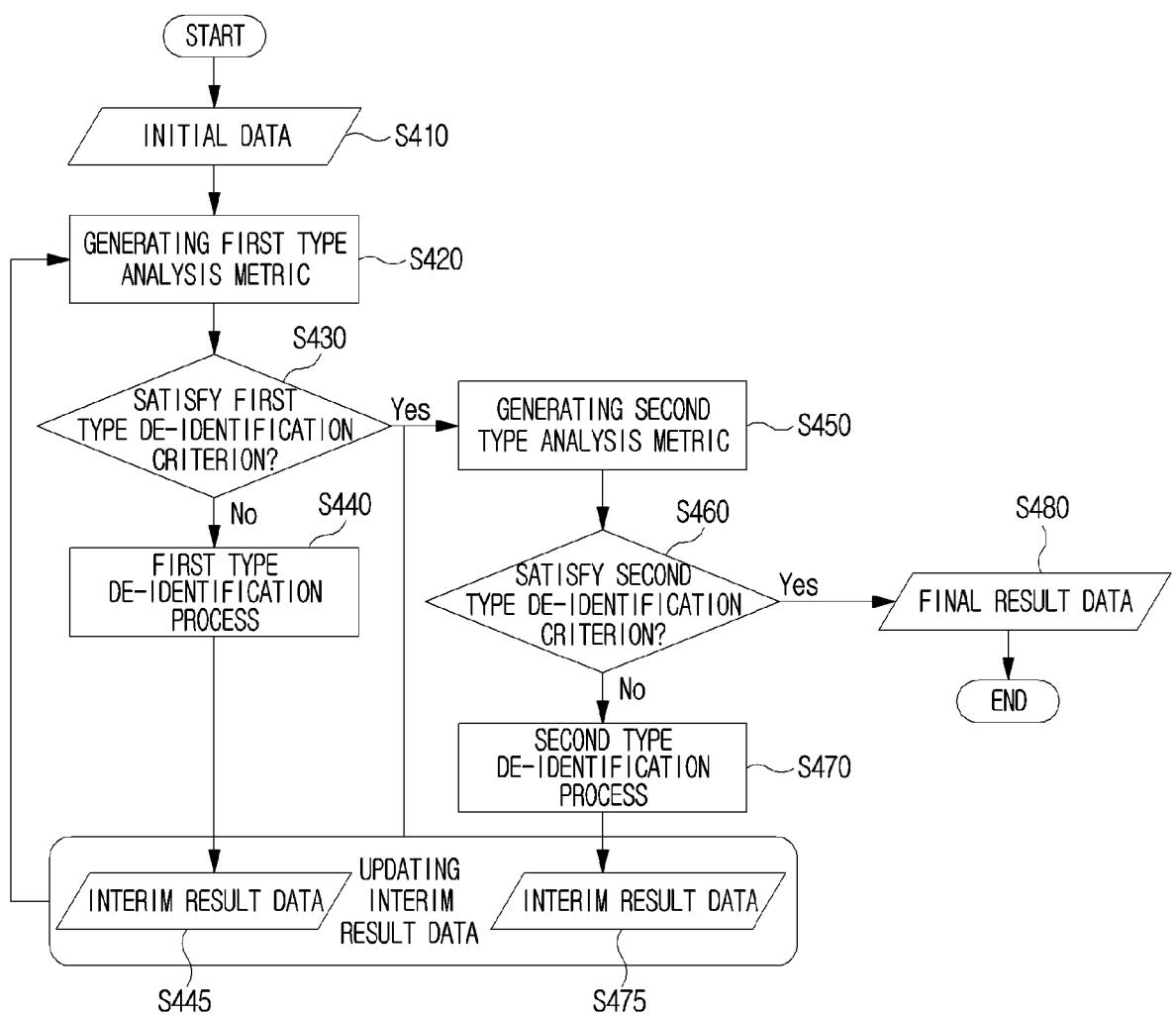
FIG. 4 is a flow diagram illustrating a method for de-identification according to an additional example of the present disclosure.

FIG. 4 is a flow diagram illustrating a method for de-identification according to an additional example of the present disclosure.

FIG. 4 illustrates an example with dividing types of de-identification processes compared to the example of FIG. 3.

According to the present disclosure, types of de-identification processes may be divided into a first type and a second type.

For example, a first type de-identification process may include one or more de-identification processes performed before or after a second type de-identification process. For example, the first type de-identification process may include data value deletion, pseudonymization, totalization, categorization, data masking, or the like.

For example, a second type de-identification process may include one or more de-identification processes of applying privacy protection model. For example, the second type de-identification process may include applying at least one of privacy protection models of K-anonymity, L-diversity, or T-closeness. In the present disclosure, applying a K-anonymity privacy protection model is described as an example for the second type de-identification process, but the scope of the present disclosure is not limited to the above example, and may include applying various privacy protection models.

That is, the first type de-identification process is not limited to a specific de-identification process, but may include one or more de-identification processes belonging to the first type. Similarly, the second type de-identification process is not limited to a specific de-identification process, but may include one or more de-identification processes belonging to the second type.

According to the example of FIG. 4, the final result data may be generated based on the interim data generated or updated by performing at least one of the first type de-identification process or the second type de-identification process.

For example, when an optimum result data is derived even when only the first type de-identification process has been performed, the final result data may be generated based on the interim result data in which no second type de-identification process has been performed. Alternatively, when it is determined that there is no need to perform the first type de-identification process on the initial data, and when an optimum result data is derived from only the second type de-identification process, the final result data may be generated based on the interim result data which is a result of the second type de-identification process. Alternatively, the final result data may be generated based on the interim result data updated by performing both the first type de-identification process and the second type de-identification process.

Here, the scope of the present disclosure is not limited by a number of types of the de-identification process or criteria for classifying the de-identification process types, and may include various methods to improve the efficiency of the de-identification procedure by determining whether an optimal result is derived from performing only some type of de-identification process.

In addition, depending on the type of the de-identification process, the type of the analysis metric and the type of the de-identification criterion may also be classified. Additionally, the analysis metric and the de-identification criterion may not be classified based on the type of the de-identification process, and the analysis metric and the de-identification criterion applicable to results of all types of de-identification process may be defined and applied.

Steps S410 to S445 of FIG. 4 may correspond to steps S310 to S345 of FIG. 3. Specifically, the generation of the analysis metric, the determination of whether the de-identification criteria are satisfied, and the de-identification process in the example of FIG. 3 may correspond to a generation of a first type analysis metric, a determination of whether the first type de-identification criteria are satisfied, and a first type de-identification process in the example of FIG. 4, respectively, and the repeated descriptions are omitted.

In step S430, when a first type analysis metric generated for an initial data or an interim result data (or an updated interim result data) satisfies first type de-identification criteria, a second type analysis metric for the corresponding data may be generated.

Accordingly, steps S450 to S480 of FIG. 4 may correspond to steps S310 to S350 of FIG. 3. The generation of the analysis metric, the determination of whether the de-identification criteria are satisfied, and the de-identification process in the example of FIG. 3, may correspond to a generation of a second type analysis metric, a determination of whether the second type de-identification criteria are satisfied, and a second type de-identification process in the example of FIG. 4, respectively, and the repeated descriptions are omitted.

In addition, according to repetitive performing of the first type de-identification process and the second type de-identification process, or each type of de-identification process, interim result data may be generated and updated.

As such, the generation of the first type analysis metric, the determination of whether the first type de-identification criteria are satisfied, the first type de-identification process, and the generation and update of the interim result data may be performed. In addition, for the data satisfying the first type de-identification criteria, the generation of the second type analysis metric, the determination of whether the second type de-identification criteria are satisfied, the second type de-identification process, and the generation and update of the interim result data may be performed. These steps may be performed until an optimal result data are derived. That is, when an updated interim result data corresponds to an optimal result data, the final result data may be generated based on this, and the de-identification procedure may be terminated.

For an additional example of the present disclosure, a multi-dimensional analysis method of data related to a de-identification process will be described below.

The data related to the de-identification process may include at least one of a data before the de-identification process is applied or a data after de-identification processing has been applied. That is, the data related to the de-identification process may be referred to as a data subjected to an analysis (i.e., an analysis target data). The analysis target data may include at least one of an initial data, a generated interim result data, an updated interim result data, or a final result data.

A multi-dimensional analysis means analyzing with selecting and comparing a part (i.e., a subset) or all of data subjected to an analysis. The data subjected to an analysis may be composed of a data set, which is a set of data series having various attributes (e.g., address, age, salary, etc.). De-identification processes may be performed sequentially or in parallel for each data series, and a plurality of de-identification processes may be performed sequentially in time for a data series. Further, the plurality of de-identification processes may have various levels depending on the degree of categorization (or generalization). As such, the data set may include various combinations of multi-dimensional elements of a data series dimension, a time dimension, and a categorization level dimension.

When the method of analyzing the interim result data of the de-identification process according to the present disclosure is not applied, excessive time and resources are required to derive an optimal result. For example, according to the de-identification processing and the de-identification result analysis according to the conventional method, only the original data and the final result data are compared and analyzed, and information used for the de-identification result analysis was biased to a specific privacy protection model (e.g., K-anonymity).

One of the objectives of the de-identification process is to obtain meaningful information through big data analysis on the result data with performing de-identification to a level that does not leak personal information. Therefore, in order to achieve the opposite goals of protecting personal information and preserving the usability of data, it is necessary to find an optimized de-identification state. In such de-identification procedure, it is difficult to obtain a desired level of result data with only one-time de-identification process, and thus, a procedure of finding an optimized result data through multiple de-identification processes is required.

Meanwhile, it may be considered of an example of de-identification process and de-identification result analysis including finding out data related to personal characteristics in a data set, processing data by applying various de-identification schemes in consideration of the meaning and form of the found data, and analyzing the modified data by applying a privacy protection model to examine the risk of personal information leakage.

In such procedure, multiple interim data may exist according to each data processing and applying a privacy protection model. In addition, in case of a categorization scheme among the de-identification schemes, there may be a wide variety of interim data depending on a number of quasi-identifier fields and a categorization setting of the quasi-identifier.

According to the conventional method for analyzing the results of de-identification, as described above, despite the presence of various interim data through the de-identification procedure, without analyzing the interim data, the entire de-identification procedure is completed based on the knowledge and the experience of the user performing the de-identification process, and the completed final result data is analyzed with comparing with the original data. This conventional method for analyzing the results of de-identification is an analysis method dependent on a specific privacy protection model, and since there is no method for analyzing the various interim data, it is required to repeat the entire de-identification procedure. In addition, the conventional method for analyzing the results of de-identification has a problem in that it is impossible to analyze the usability of data and the risk of personal re-identification, when applying a privacy protection model other than K-anonymity which is a specific privacy protection model.

According to a method for analyzing interim result data of the de-identification procedure of the present disclosure, analysis with freely selecting and comparing a subset of data for each node in a two-dimensional lattice structure according to a series dimension, a time dimension, and a categorization level dimension may be supported with respect to, as well as the final result data of which the de-identification procedure has been completed, each interim result data according to each de-identification process (i.e., data processing and applying privacy protection model). Accordingly, how the data has been changed in terms of the usability and the risk due to each de-identification process may be measured, thereby significantly reducing the de-identification procedure. In addition, since the usability and the risk may be analyzed for data to which a privacy protection model is not applied, assessment of the usability and the risk of re-identification of data in various de-identification environments may be supported.

A de-identification procedure may include largely classified steps of data processing (deletion of data values, pseudonymization, totalization, categorization, data masking, etc.), privacy protection model application, and post-process data processing.

According to the conventional method for analyzing the results of de-identification, the final result data after completing all steps of data processing, privacy protection model application, and post-process data processing is analyzed, and whether re-doing will be required or not is determined.

Meanwhile, according to the present disclosure, analysis may be performed with respect to, as well as the initial data and the final result data, with respect to each interim result data of each de-identification processes of data processing, privacy protection model application, post-process data processing. For example, it may be supported to enable analysis on the usability, the risk, or the like by analyzing with comparing the interim result data of each de-identification process with the initial data.

Specifically, immediately after performing each de-identification process, by analyzing the risk, the usability, or the like of the data in the state of being applied of the corresponding de-identification process, it may be immediately checked whether the corresponding de-identification process is sufficient to protect personal information, and whether sufficient information remains to utilize the result data. In the case of interim result data that satisfies an appropriate level of usability and risk, it may be used as the final result data without going through a subsequent process.

Figure 5:
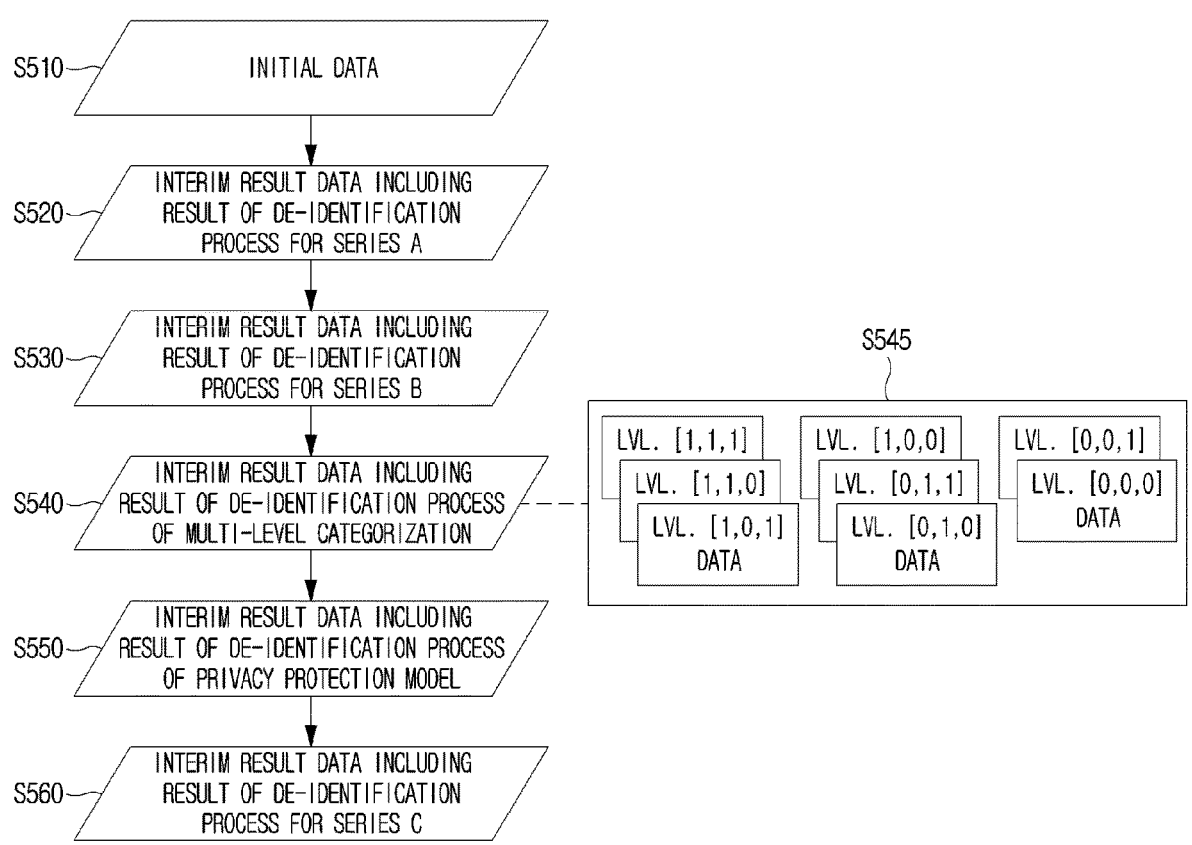
FIG. 5 is a diagram illustrating an example of de-identification processes, analysis target data, and analysis metrics according to the present disclosure.

FIG. 5 is a diagram illustrating an example of de-identification processes, analysis target data, and analysis metrics according to the present disclosure.

In FIG. 5, interim result data generated while various de-identification processes are performed on an initial data are exemplarily shown.

In S510, characteristics of an initial data may be analyzed using an analysis metric such as a distribution chart. In addition, based on the analysis metric for the initial data, a de-identification process scheme to be applied subsequently may be selected.

In S520, analysis on a result of a de-identification process for a series A may be performed. Specifically, data including the result of the de-identification process for the series A with accumulating on the initial data may be generated as an interim result data.

In S530, analysis on a result of a de-identification process for a series B may be performed. Specifically, an interim result data updated by data including the result of the de-identification process for the series B with accumulating on a previous interim data may be generated.

In steps S520 and S530, characteristics of data may be analyzed using an analysis metric after performing de-identification process for each series. Accordingly, by analyzing with comparing the analysis metrics of the initial data and the interim result data, or the previous interim result data and the updated interim result data, it may be determined whether de-identification criteria in various aspects such as usability and risk are satisfied.

In S540, analysis on a result of a de-identification process of a multi-level categorization scheme may be performed. For example, when a multi-level categorization is applied, a data subset having a relationship in a form of a two-dimensional lattice may be generated according to a combination in which various categorization levels are applied to each of a plurality of series. An interim result data updated by the generated data subset with accumulating on a previous interim result data may be generated. By directly generating and comparing analysis metrics for each of these data subsets, among various data subsets, a data subset that satisfies predetermined criteria may be selected.

For example, as shown in step S545, a categorization level (LVL.) 0 or 1 may be applied to each of the series [A, B, C], and in this case, 8 subsets of data which are results of multi-level categorizations may be generated. Here, a series of data to which a categorization is applied, or a depth of a categorization level is exemplary, and the scope of the present disclosure is not limited thereto.

In S550, an analysis on a de-identification process of a privacy protection model application may be performed. For example, a K-anonymity privacy protection model may be applied to a previous interim result data, and an interim result data updated by removing data (i.e., records) that does not satisfy the K value may be generated. Accordingly, in addition to a previous analysis metric, an analysis metric related to K-anonymity may be further analyzed.

In S560, analysis on a result of a de-identification process for a series C may be performed. For example, the de-identification process for the series C may correspond to a post-process data processing applicable only to interim result data to which a multi-level categorization and/or K-anonymity privacy protection model is applied. Accordingly, an interim result data updated by data including the result of the de-identification process for the series C with accumulating on a previous interim data may be generated.

As a result of analysis based on generating an analysis metric for an interim result data generated in S560, it may be confirmed that the data satisfies de-identification criteria suitable for data utilization purpose (e.g., big data analysis). In this case, based on the interim result data, final result data may be generated.

When analyzing a final result data after completing an entire de-identification procedure, it is required to repeat the entire de-identification procedure to derive an appropriate final result data. Therefore, the time required due to the repetitive work on a large amount of data and the resources required to store multiple final result data resulting from the repetitive work are rapidly increased. On the other hand, according to the present disclosure, when analysis is performed on interim result data of each de-identification process included in a de-identification procedure and whether a subsequent de-identification process is performed or which subsequent de-identification process scheme is selected in consideration of the analysis result, an optimized final result data may be derived through a single de-identification procedure, thereby greatly reducing the time and resources required for de-identification procedure.

To this end, according to the present disclosure, by defining and applying an analysis metric for interim result data considering characteristics of each de-identification process, it may be supported that a user does not need to re-do the entire de-identification procedure repeatedly.

Table 1 shows an example of an analysis metric according to the present disclosure. As shown in Table 1, analysis metrics applicable to different de-identification processes may be the same or different. The present disclosure includes generating a part or all of applicable analysis metrics for a result of each de-identification process, and does not exclude applying analysis metrics not included in Table 1.

TABLE 1

| Applicable de-identification process | Analysis metric characteristics | Example of analysis metric |
| --- | --- | --- |
| Any de-identification process | Column distribution | Min/max/avg/top & bottom coding limit |
| Any de-identification process | Column distribution chart | Distribution chart |
| Any de-identification process | Two-column relationship analysis chart | Contingency map (Heat map) |
| Any de-identification process | Sample uniqueness index | Population Uniqueness |
| Any de-identification process | Similarity comparison | Cosine similarity |
| Any de-identification process | Similarity comparison | Jaccard similarity |
| Any de-identification process | Similarity comparison | Euclidean similarity (Euclidean distance) |
| Any de-identification process | Similarity comparison | Levenshtein distance |
| Any first type de-identification process | Comparison index before/after de-identification | crossMean |
| Any first type de-identification process | Comparison index before/after de-identification | corMAE |
| Any first type de-identification process | Comparison index before/after de-identification | IL (Information Loss) |
| Any first type de-identification process | Comparison index before/after de-identification | MD (Mean Distribution) |
| Any first type de-identification process | Between-series correlation analysis | Classification Accuracy |
| Multi-level categorization scheme of first type de-identification process | Usability index | Discernibility Metric |
| Multi-level categorization scheme of first type de-identification process | Usability index | Entropy |
| Multi-level categorization scheme of first type de-identification process | Usability index | Precision |
| Multi-level categorization scheme of first type de-identification process | Categorization multi-level distribution chart | HG 2 level pie chart |
| Second type de-identification process and subsequent de-identification process | Re-identification risk index | Re-Identification risk min/max/avg |
| Second type de-identification process and subsequent de-identification process | Re-identification risk index | prosecutor model |
| Second type de-identification process and subsequent de-identification process | Re-identification risk index | journalist model |
| Second type de-identification process and subsequent de-identification process | Re-identification risk index | marketer model |
| Second type de-identification process and subsequent de-identification process | Usability index | Suppression |
| Second type de-identification process and subsequent de-identification process | Index by privacy protection model | K/L/T |
| Second type de-identification process and subsequent de-identification process | Comparison index before/after de-identification | Class size (min/max/avg) |

In the following, based on a method for analyzing interim result data of a de-identification procedure of the present disclosure, a method for saving required resources (e.g., storage space) will be described.

When a method for analyzing interim result data of a de-identification procedure according to the present disclosure is not applied, one final result data is generated after completing an entire de-identification procedure, and a plurality of final result data are generated depending on a number of re-doing or repetition of the de-identification procedure. In this case, each final result data may include duplicated data. For this reason, a space for storing the plurality of final result data is required until an optimum final result data is derived, which leads to a waste of resources because the storage of duplicated data cannot be avoided. In particular, when multi-level categorization is applied, dozens to thousands of data subsets included in a two-dimensional lattice structure are generated, and for analysis of the entire final result data including this, a considerable amount of storage space is filled with duplicated data. In addition, since the size of the original data is very large for data for big data analysis, in order to compare and analyze a plurality of final result data which are the results of completing a plurality of de-identification procedures to select the optimal final result data, a plurality of final result data are required to be generated and maintained, which increases the time and space waste.

As described above, when generating or updating interim result data for each of the de-identification processes according to the present disclosure, with accumulating on a previous interim result data (i.e., with maintaining a previous interim result data), an interim result data including a result of a subsequent de-identification process may be generated. Accordingly, storing duplicated data may be prevented, and the required resources may be minimized.

Specifically, according to the present disclosure, after each de-identification process, an analysis metric for an interim result data may be generated, and whether a de-identification criterion is satisfied may be determined.

An interim result data that satisfies a de-identification criterion may be directly used as a final result data without performing additional de-identification process. Accordingly, time for data processing and resources for data storage may be greatly reduced.

For an interim result data that does not satisfy a de-identification criterion due to sensitivity levels of data, limitations of de-identification process schemes, or the like, additional de-identification process may be performed, and a final result data that satisfies a predetermined de-identification criterion or legal requirements may be derived.

FIG. 6 to FIG. 10 are diagrams illustrating an example of updating interim result data and extracting final result data according to the present disclosure.

According to the present disclosure, results of de-identification processes may be accumulated in one table. For example, a first interim result data may be generated or updated by adding a result of a first de-identification process to an initial data in a form of a table. In addition, a second interim result data may be generated or updated by adding a result of a second de-identification process to the first interim result data.

Alternatively, results of de-identification process may be selectively accumulated in one table. For example, after adding all of results of a second de-identification process to a first interim result data, a part of the results corresponding to an analytic metric that satisfies a de-identification criterion may be maintained while others may be deleted, and in this way, a second interim result data may be generated or updated.

Accordingly, multi-dimensional analysis may be directly applied to each step of de-identification process.

In the example of FIG. 6 to FIG. 10, for clarity of description, it is assumed that an initial data includes data of three series, that is, data of series A, series B, and series C. Each series may be represented as one column (COL.) in an initial data, an interim result data, and a final result data. A result data of a de-identification process performed on a COL. X (X=A, B, or C) may be expressed as a COL. X'. In addition, a result data of a de-identification process of a Y-level (Y=1, 2, 3, . . . ) categorization scheme performed on a COL. X may be expressed as a COL. X with LVL. Y. A categorization of LVL. 0 means that no categorization is applied, so it may not be represented separately.

Figure 6:
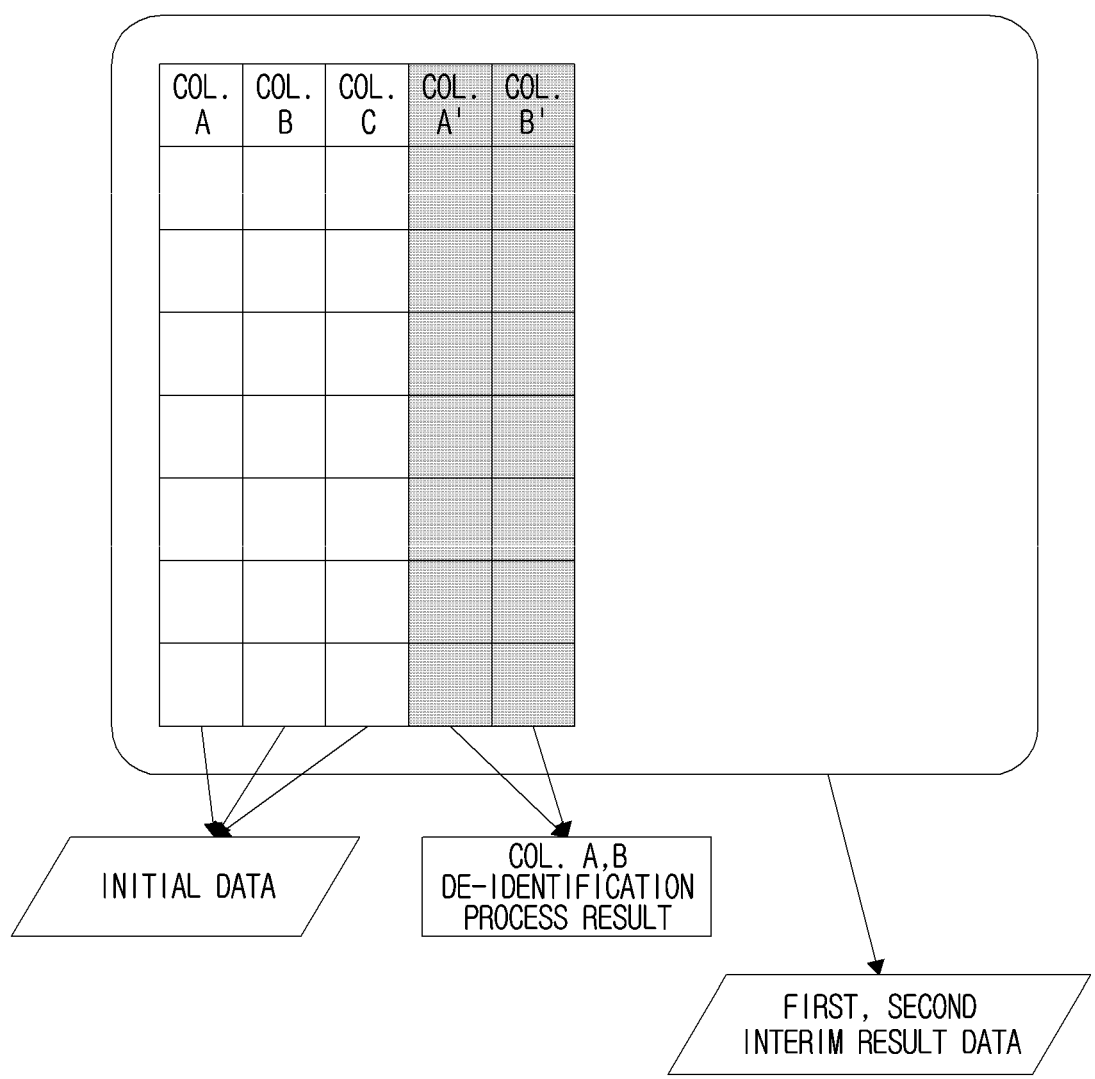
FIG. 6 to FIG. 10 are diagrams illustrating an example of updating interim result data and extracting final result data according to the present disclosure.

The example of FIG. 6 may correspond to S510 to S530 of FIG. 5.

In FIG. 6, an initial data may include data of a COL. A, COL. B, and COL. C. A result of a de-identification process performed on the COL. A of the initial data may be added as a COL. A' with accumulating on the initial data. The result may be generated as a first interim result data.

In addition, a result of de-identification process performed on the COL. B may be added as a COL. B' with accumulating on the initial data or the first interim result data to which the COL. A' has been added. This result may be generated as a second interim result data.

For example, for the COL. A', COL. B, and COL. C of the first interim result data, analysis metrics may be generated and whether de-identification criteria are satisfied may be determined. For COL. A', COL. B' and COL. C of the second interim result data, analysis metrics may be generated and whether de-identification criteria are satisfied may be determined.

When analysis metrics for the first interim result data or the second interim result data are generated and the analysis metrics satisfy predetermined de-identification criteria, without performing a subsequent de-identification process, a final result data may be generated based on the first interim result data or the second interim result data. When an analysis metric for the second interim result data does not satisfy a predetermined de-identification criterion, a subsequent de-identification process may be performed.

Figure 7:
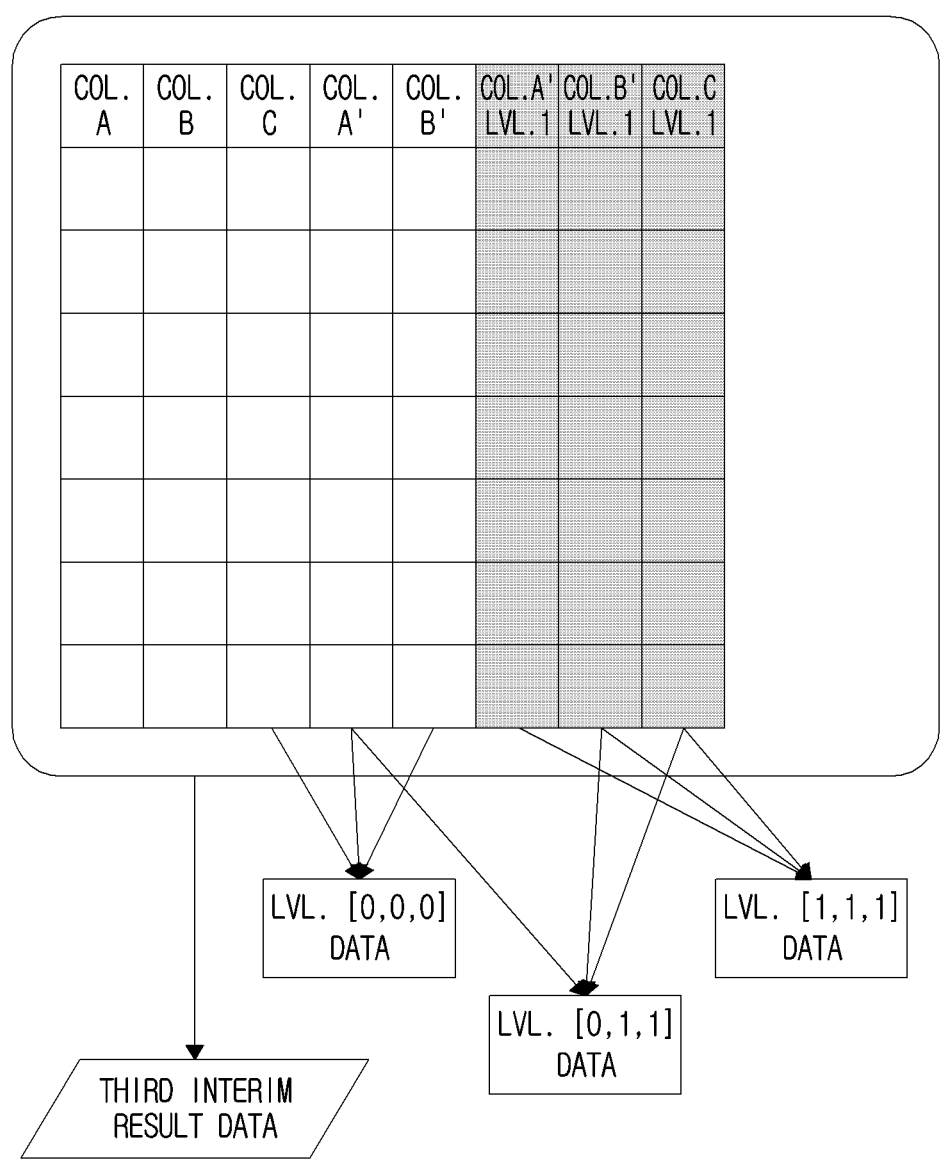

The example of FIG. 7 may correspond to S540 of FIG. 5.

In FIG. 7, a de-identification process of multi-level categorization may be additionally performed on COL. A' and COL. B' to which de-identification process has been applied and on COL. C to which de-identification process has not been applied. For example, for each of columns [A', B', C], LVL. 0 categorization or LVL. 1 categorization may be applied. Accordingly, with accumulating on the second interim result data, COL. A' with LVL. 1, COL. B' with LVL. 1 and COL. C with LVL. 1 may be added as a result of applying LVL. 1 categorization to each of COL. A', COL. B' and COL. C. This result may be generated as a third interim result data.

Here, analysis metrics for various combinations according to multi-level categorization may be generated, and whether predetermined de-identification criteria are satisfied may be determined. For example, a combination corresponding to [LVL. 0, LVL. 0, LVL. 0] categorization is [COL. A', COL. B', COL. C], an analysis metric for the combination may be generated, and whether a predetermined de-identification criterion is satisfied may be determined for the combination. Another combination corresponding to [LVL. 0, LVL. 1, LVL. 1] categorization is [COL. A', COL. B' with LVL. 1, COL. C with LVL. 1], and yet another combination corresponding to [LVL. 1, LVL. 1, LVL. 1] categorization is [COL. A' with LVL. 1, COL. B' with LVL. 1, COL. C with LVL. 1], an analysis metric for each of the combinations may be generated, and whether a predetermined de-identification criterion is satisfied may be determined for each of the combinations.

In the example of FIG. 7, only three of the eight possible multi-level categorization combinations are illustrated, but each of all possible combinations of multi-level categorization corresponds to one of the combinations of the columns of the table in FIG. 7, and an analysis metric for each of the combinations may be generated, and whether a predetermined de-identification criterion is satisfied may be determined for each of the combinations.

When an analysis metric of the third interim result data satisfies a predetermined de-identification criterion, without performing a subsequent de-identification process, a final result data may be generated based on the third interim result data. Alternatively, when an analysis metric of the third interim result data does not satisfy a predetermined de-identification criterion, a subsequent de-identification process may be performed.

Figure 8:
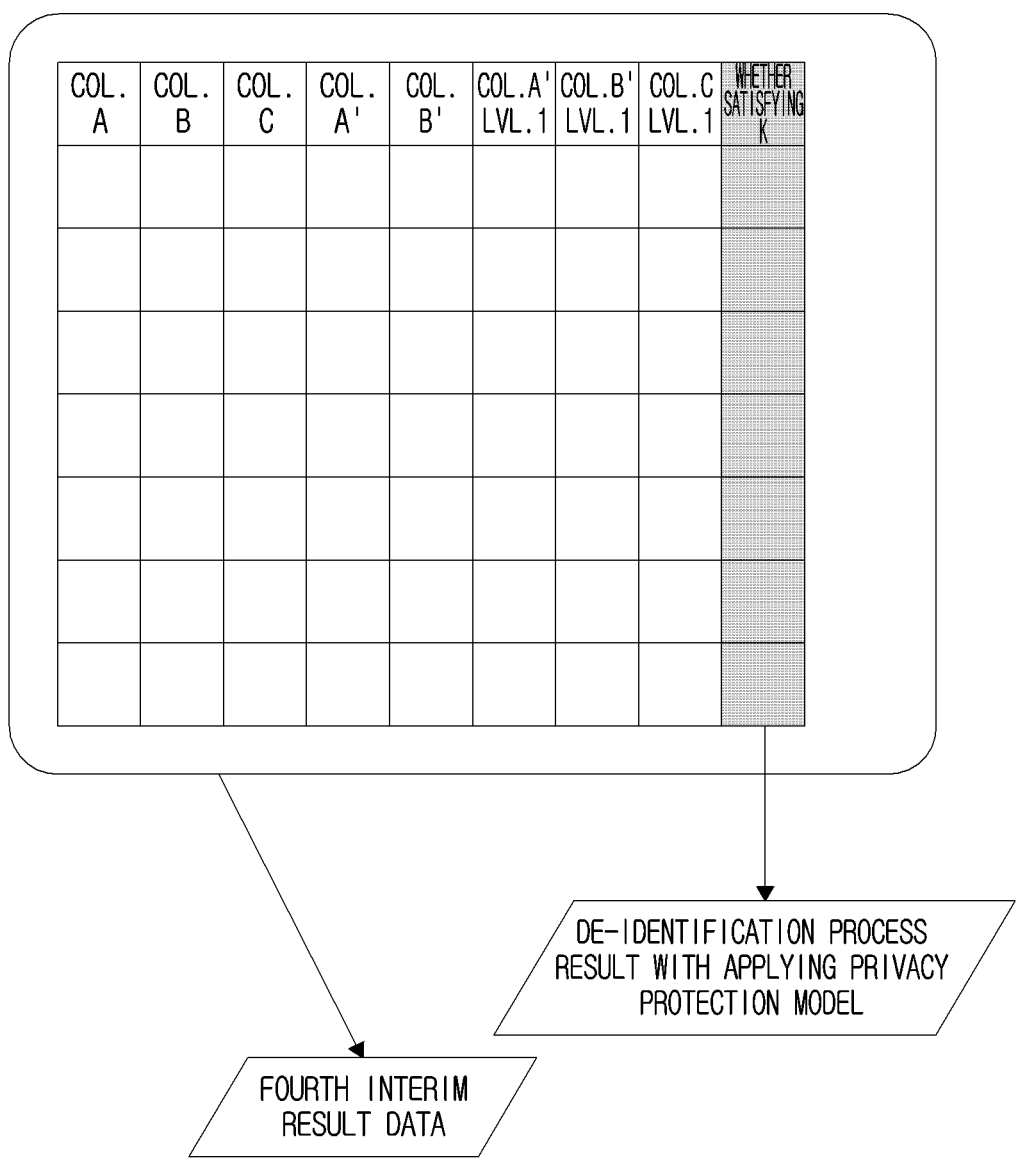

The example of FIG. 8 may correspond to S550 of FIG. 5.

In FIG. 8, with accumulating on the third interim result data, a result of a de-identification process applying a privacy protection model for K-anonymity may be added as a column that is referred to as "whether satisfying K". This result may be generated as a fourth interim result data. COL. "whether satisfying K" may indicate whether each record is subjected to being maintained or being deleted. In addition, for the fourth interim result data, an analysis metric may be generated, and whether a predetermined de-identification criterion is satisfied may be determined.

When an analysis metric of the fourth interim result data satisfies a predetermined de-identification criterion, without performing a subsequent de-identification process, a final result data may be generated based on the fourth interim result data. Alternatively, when an analysis metric of the fourth interim result data does not satisfy a predetermined de-identification criterion, a subsequent de-identification process may be performed.

Figure 9:
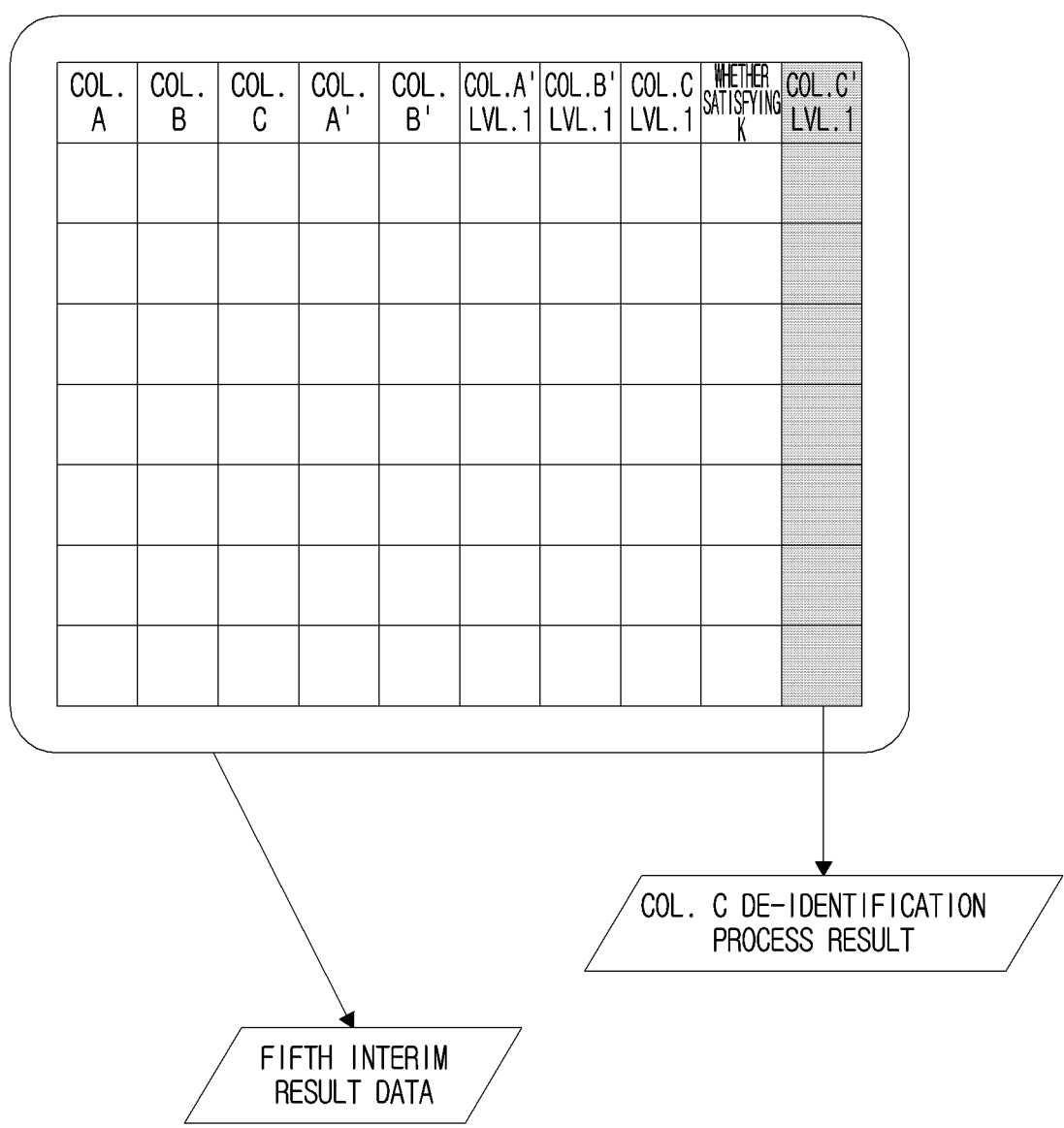

The example of FIG. 9 may correspond to S560 of FIG. 5.

In FIG. 9, as a post-process data processing after the LVL. 1 categorization for COL. C and the de-identification process of the K-anonymity privacy protection model, a result of a de-identification process performed on COL. C, that is, COL. C' with LVL. 1 may be added with accumulating on the fourth interim result data. This result may be generated as a fifth interim result data. In addition, for the fifth interim result data, an analysis metric may be generated, and whether a predetermined de-identification criterion is satisfied may be determined.

When an analysis metric of the fifth interim result data satisfies a predetermined de-identification criterion, without performing a subsequent de-identification process, a final result data may be generated based on the fifth interim result data. Alternatively, when an analysis metric of the fifth interim result data does not satisfy a predetermined de-identification criterion, a subsequent de-identification process may be performed.

Figure 10:
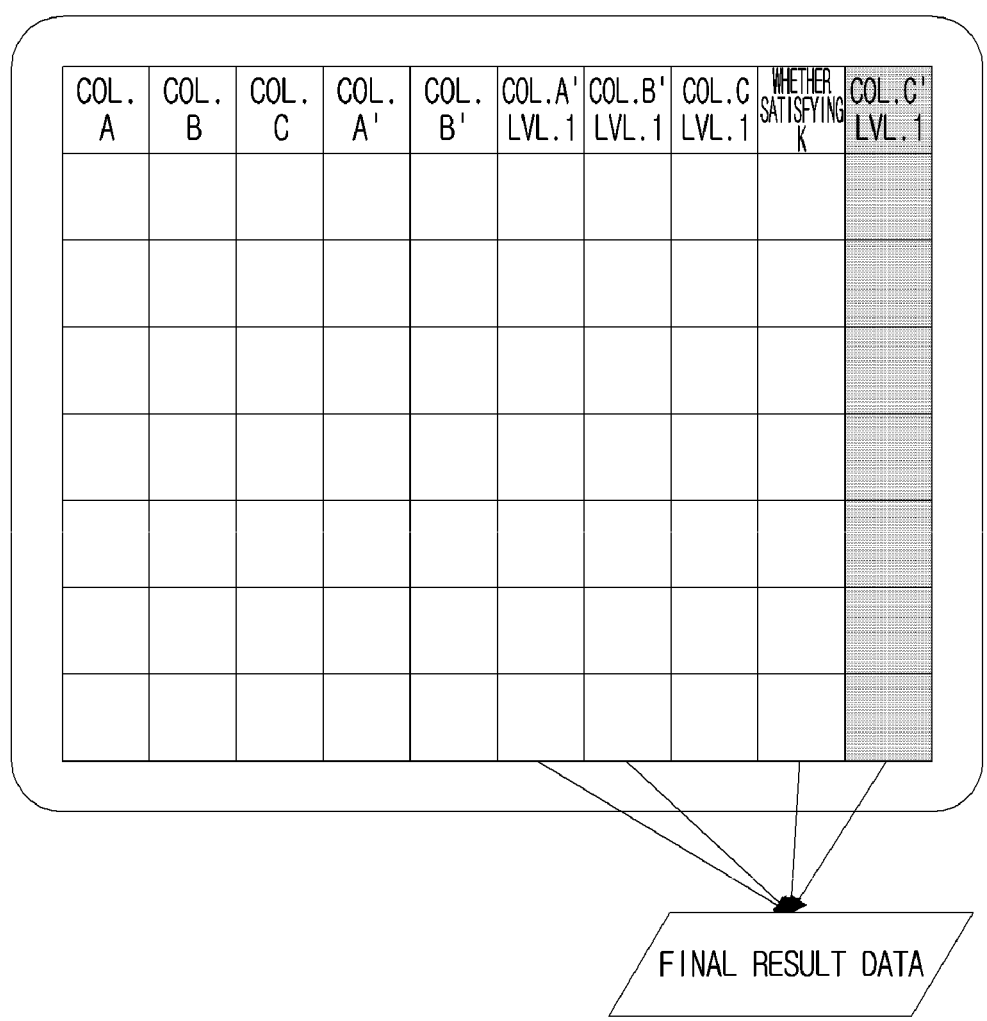

FIG. 10 shows an example of extracting a final result data from an interim result data.

It may be assumed that an analysis metric of the fifth interim result data illustrated in FIG. 9 is determined to satisfy a predetermined de-identification criterion. Accordingly, no additional de-identification process is performed, and a final result data may be extracted based on the fifth interim result data.

In the example of FIG. 10, a final data may be extracted by combining COL. A' with LVL. 1, COL. B' with LVL. 1, COL. C' with LVL. 1 and COL. "whether satisfying K."

That is, an interim result data may be configured in a form of accumulation of all previous results of de-identification process without duplication. When analysis metrics of an interim result data satisfy predetermined de-identification criteria, a final result data may be extracted from the corresponding interim result data.

When performing an interim result data update by accumulating in one table (or one file) in this way, even without generating and storing a result data in a separate file for each of numerous possible combinations of de-identification processes, various combinations may be selectively analyzed within one updated interim result data, and a final result data may be extracted. Accordingly, time required for data analysis and resources required for data storage may be greatly saved.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, other steps may be included to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, or the like.

The scope of the present disclosure is to encompass software or machine-executable instructions (e.g., operating system, applications, firmware, instructions, and the like) by which operations according to method of various embodiments are executed on a device or a computer, and non-transitory computer-readable media executable on the device or the computer, on which such software or instructions are stored.

The invention claimed is:

1. A method for de-identification for data, the method comprising:
receiving, through a transceiver, an initial data and storing the initial data in a memory;
applying, by a processor, a first de-identification process to the initial data to obtain first interim result data;
obtaining and outputting, by the processor, final result data based on a part of data subsets included in the first interim result data, when first analysis metric for the first interim result data satisfies a first de-identification criterion, thereby reducing time or resources to output the final result data;
applying, by the processor, a second de-identification process to the first interim result data, when a first analysis metric for the first interim result data does not satisfy the first de-identification criterion to obtain second interim result data; and
obtaining and outputting, by the processor, final result data based on a part of data subsets included in the second interim result data, when a second analysis metric for the second interim result data satisfies a second de-identification criterion, thereby reducing time or resources to output the final result data,
wherein the first interim result data includes the initial data and a result of the first de-identification process, and the result of the first de-identification process is accumulated on the initial data,
wherein the second interim result data includes initial data, the result of the first de-identification process, and a result of the second de-identification process, and the result of the second de-identification process is accumulated on the first interim result data.

2. The method according to claim 1, wherein:
the first analysis metric is obtained based on a part of all of data subsets included in the first interim result data; and
the second analysis metric is obtained based on a part of all of data subsets included in the second interim result data.

3. The method according to claim 1, wherein:
the first de-identification process corresponds to a first type de-identification process; and
the second de-identification process corresponds to a second type de-identification process.

4. The method according to claim 3, further comprising:
applying, to the first interim result data or the first interim result data, at least one additional de-identification process corresponding to the first type de-identification process or the second type de-identification process to obtain an additional interim result data, when the first analysis metric does not satisfy the first de-identification criterion or the second analysis metric does not satisfy the second de-identification criterion; and
obtaining and outputting final result data based on a part of data subsets included in the additional interim result data, when an additional analysis metric for the additional interim result data satisfies an additional de-identification criterion, thereby reducing time or resources to output the final result data.

5. The method according to claim 3, wherein:
the first type de-identification process includes at least one de-identification process applied before or after the second type de-identification process; and the second type de-identification process includes at least one de-identification process of applying a predetermined privacy protection model.

6. The method according to claim 1, wherein:
the first analysis metric includes standardized measurement data applicable to a result of the first de-identification process; and
the second analysis metric includes standardized measurement data applicable to a result of the second de-identification process.

7. An apparatus for de-identification for data, the apparatus comprising:
a transceiver;
a memory;
a user interface; and
a processor,
wherein the processor is configured to:
receive an initial data through the transceiver;
store the initial data in the memory;
apply a first de-identification process to the initial data to obtain first interim result data;
obtain and to output final result data based on a part of data subsets included in the first interim result data, when first analysis metric for the first interim result data satisfies a first de-identification criterion, thereby reducing time or resources to output the final result data;
apply a second de-identification process to the first interim result data, when a first analysis metric for the first interim result data does not satisfy the first de-identification criterion to obtain second interim result data; and
obtain and to output final result data based on a part of data subsets included in the second interim result data, when a second analysis metric for the second interim result data satisfies a second de-identification criterion, thereby reducing time or resources to output the final result data,
wherein the first interim result data includes the initial data and a result of the first de-identification process, the result of the first de-identification process is accumulated on the initial data, and
wherein the second interim result data includes initial data, the result of the first de-identification process, and a result of the second de-identification process, and the result of the second de-identification process is accumulated on the first interim result data.

8. A non-transitory computer-readable storing medium storing a computer program for executing a method at a computer according to claim 1.

9. The method according to claim 3, wherein:
the first type de-identification process includes at least one of data value deletion, pseudonymization, totalization, categorization, or data masking; and
the second type de-identification process includes applying at least one privacy protection model of K-anonymity, L-diversity, or T-closeness.

* * * * *